(12) United States Patent
Hara (10) Patent No.: US 9,609,303 B2
(45) Date of Patent: Mar. 28, 2017

(54) IMAGE GENERATION APPARATUS AND METHOD FOR CONTROLLING THE SAME

(71) Applicant: CANON KABUSHIKI KAISHA, Tokyo (JP)

(72) Inventor: Takayuki Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 14/711,913

(22) Filed: May 14, 2015

(65) Prior Publication Data

US 2015/0341612 A1 Nov. 26, 2015

(30) Foreign Application Priority Data

May 20, 2014 (JP) ................. 2014-104516

(51) Int. Cl.
*G06K 9/00* (2006.01)
*H04N 13/00* (2006.01)
*H04N 13/02* (2006.01)
*G06T 7/00* (2017.01)
*G06T 15/10* (2011.01)
*G01C 3/08* (2006.01)

(52) U.S. Cl.
CPC ......... *H04N 13/0022* (2013.01); *G01C 3/085* (2013.01); *G06T 7/0024* (2013.01); *G06T 7/0069* (2013.01); *G06T 15/10* (2013.01); *H04N 13/0271* (2013.01); *H04N 13/0275* (2013.01); *G06T 2207/10028* (2013.01); *H04N 2013/0081* (2013.01)

(58) Field of Classification Search
CPC ........... H04N 13/0022; H04N 13/0271; H04N 13/0275; H04N 2013/0081; G01C 3/085; G06T 7/0069; G06T 15/10; G06T 7/0024; G06T 2207/10028
USPC ........................................................ 382/154
See application file for complete search history.

(56) References Cited

U.S. PATENT DOCUMENTS

| | | | | |
|---|---|---|---|---|
| 5,726,704 A | * | 3/1998 | Uomori ............. | H04N 13/0014 348/47 |
| 2007/0097207 A1 | * | 5/2007 | Toriumi ................. | G06T 7/004 348/44 |
| 2013/0004082 A1 | * | 1/2013 | Kano ..................... | G06T 5/002 382/195 |

(Continued)

FOREIGN PATENT DOCUMENTS

JP  2009-239485 A  10/2009
JP  4424299 B  3/2010

*Primary Examiner* — John Strege
(74) *Attorney, Agent, or Firm* — Cowan, Liebowitz & Latman, P.C.

(57) ABSTRACT

An image generation apparatus includes a holding unit configured to acquire and hold pixel values of pixel groups that serve as targets for comparison from the respective first and second images; a reading unit configured to sequentially read out, from the pixel values of the respective pixel groups that are held in the holding unit, pixel values in one direction for each area that is set depending on a pixel position of the range image; a calculation unit configured to calculate an evaluation value based on the pixel values read out by the reading unit; an estimation unit configured to estimate the subject distance based on the evaluation value; and a generation unit configured to generate a range image based on the subject distance estimated by the estimation unit.

9 Claims, 7 Drawing Sheets

(56) References Cited

U.S. PATENT DOCUMENTS

2013/0343635 A1\* 12/2013 Omata ............... H04N 13/0022
382/154

\* cited by examiner

IMAGE GENERATION APPARATUS AND METHOD FOR CONTROLLING THE SAME

BACKGROUND OF THE INVENTION

Field of the Invention

The present invention relates to a technique for improving, in an apparatus for generating a range image based on parallax images, the processing speed of range image generation processing.

Description of the Related Art

Various methods have been proposed as a method for realizing an apparatus for generating a range image based on two parallax images that have a parallax. For example, Japanese Patent No. 4424299 and Japanese Patent Laid-Open No. 2009-239485 have proposed methods for generating a range image using template matching. An operation and a configuration of an ordinary circuit that performs template matching will be described with reference to the drawings. Furthermore, for the sake of description, two parallax images that have a parallax are respectively indicated as an A-image and a B-image.

Figure 7:
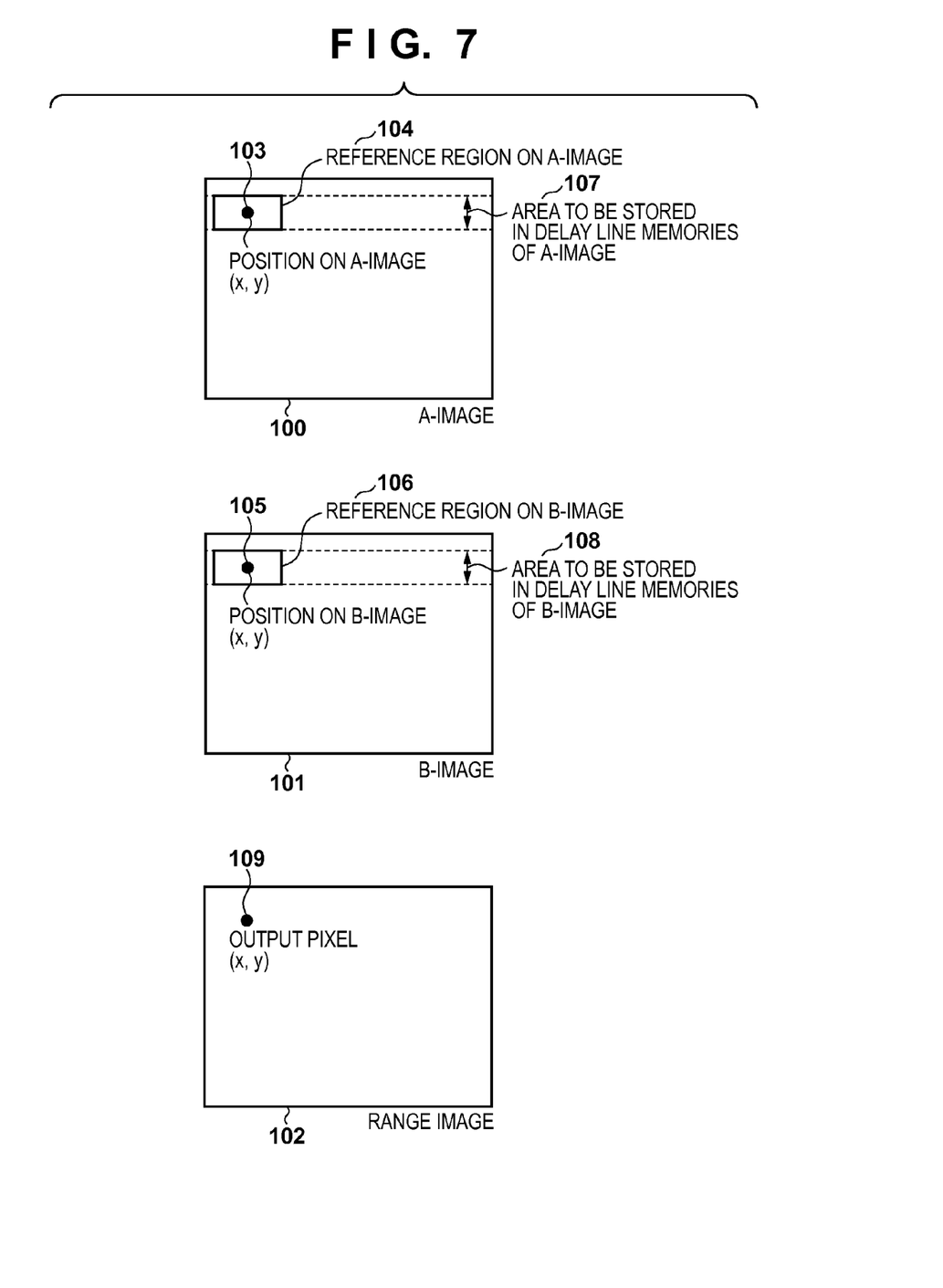
FIG. 7 is a diagram showing input and output images in range image generation processing.

FIG. 7 is a diagram showing input images (an A-image 100 and a B-image 101) that are parallax images, an output image 102 that is a range image, and reference regions in the input images that are referred to for calculation of output pixels constituting the output image. For example, in order to output an output pixel (x, y) 109, the reference region 104 on the A-image 100 and the reference region 106 on the B-image 101 are referred to.

The output of the output pixel (x, y) 109 will be described more specifically. First, a region 107, which is a part of the A-image 100 and to be stored in delay line memories for A-image, is held in the delay line memories for A-image. Similarly, a region 108, which is a part of the B-image 101 and to be stored in delay line memories for B-image, is held in the delay line memories for B-image.

Then, an area that corresponds to the reference region 104 on A-image is read from the delay line memories for A-image, and the pixel values are held in a memory element group for A-image. On the other hand an area that corresponds to the reference region 104 on B-image is read from the delay line memories for B-image, and the pixel values are held in a memory element group for B-image. By comparing the pixel values stored in the memory element group for A-image with the pixel values stored in the memory element group for B-image, a distance value that corresponds to the output pixel (x, y) 109 is calculated.

Figure 8:
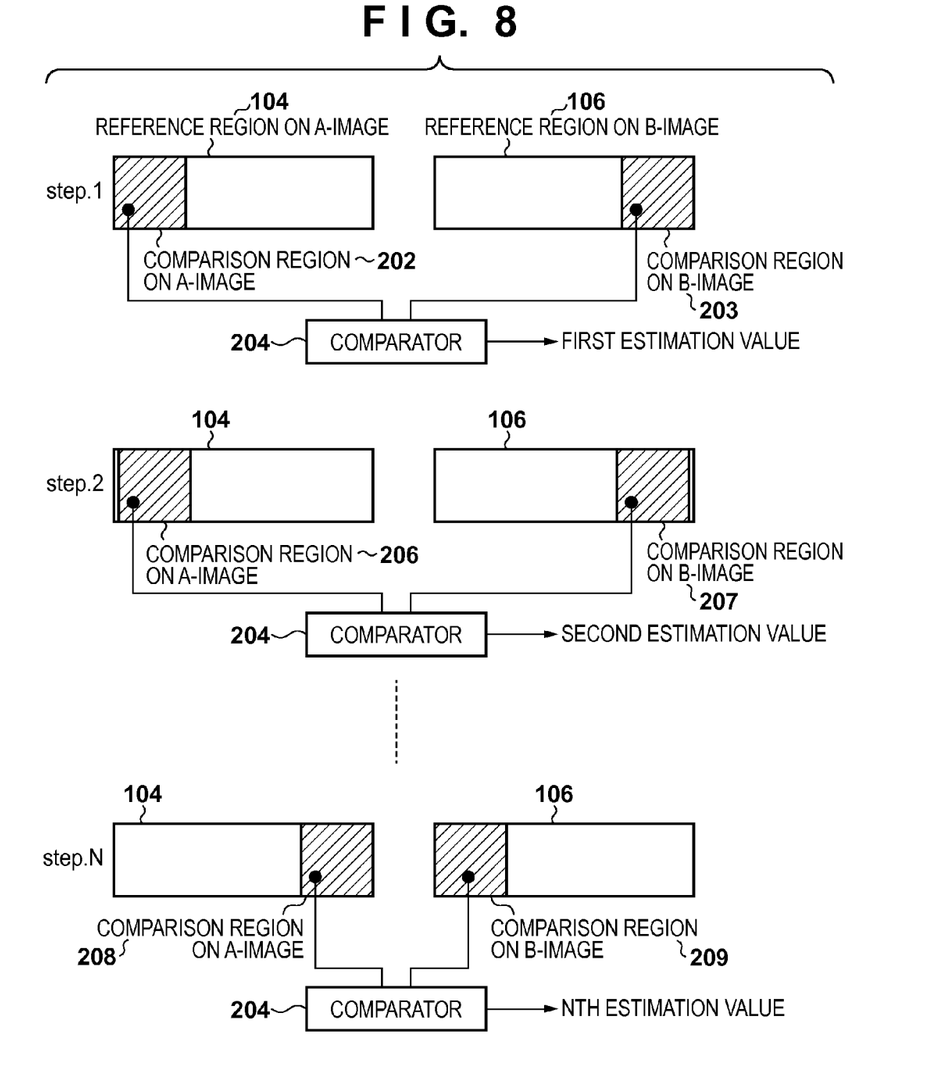
FIG. 8 is a diagram showing a process sequence of the range image generation processing.

This comparison is executed in the procedure as shown in FIG. 8. In Step 1 of FIG. 8, a comparison region 202 on A-image, which is a square area at the left end of the reference region 104 on A-image, is read into the memory element group for A-image, and a comparison region 203 on B-image, which is a square area at the right end of the reference region 104 on B-image, is read into the memory element group for B-image. By comparing these pixel values that are stored in the memory element group for A-image and the memory element group for B-image, a first evaluation value is calculated.

In Step 2, a comparison region 206 on A-image, which is obtained by shifting the comparison region 202 on A-image to the right by one pixel within the reference region 104, is read into the memory element group for A-image, and a comparison region 207 on B-image, which is obtained by shifting the comparison region 203 on B-image to the left by one pixel within the reference region 106, is read into the memory element group for B-image. By comparing the pixel values that are stored in the memory element group for A-image and the memory element group for B-image, a second evaluation value is obtained.

Thereafter, evaluation values are sequentially obtained while performing shifting to the right by one pixel with respect to the memory element group for A-image and shifting to the left by one pixel with respect to the memory element group for B-image. Based on the plurality of evaluation values that were obtained in this manner using the corresponding reference regions for output pixels (x, y), a distance that corresponds to the evaluation value that is determined to be most similar is estimated, and the pixel value of the range image is obtained.

Therefore, in the conventional method for generating a range image, the reading-out processing from the delay line memories for A-image onto the memory element group for A-image, and the reading-out processing from the delay line memories for B-image onto the memory element group for B-image are needed for all pixels of the range image that is to be output, causing the problem that a long processing time is needed.

Figure 9:
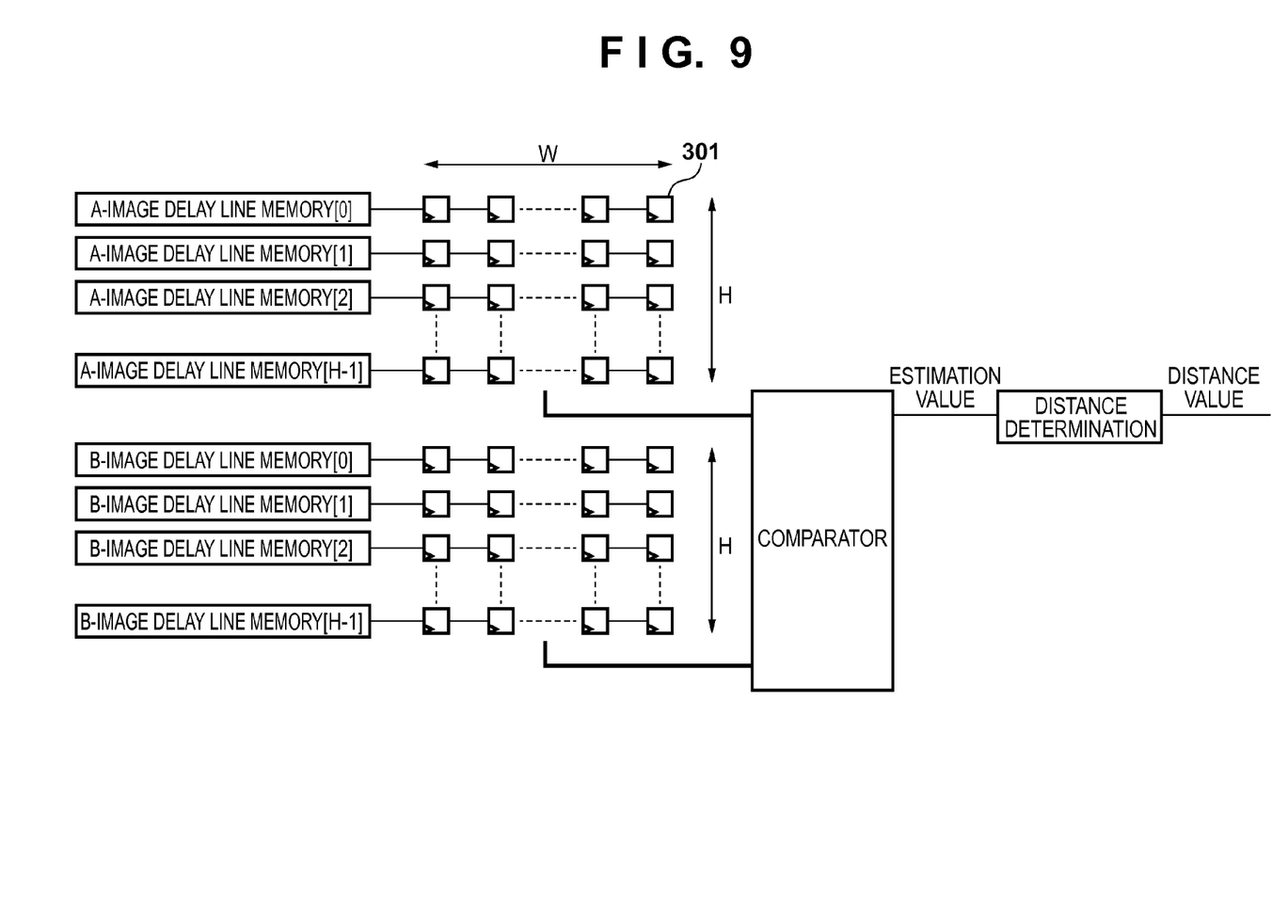
FIG. 9 is a diagram schematically showing a configuration of a range image generating circuit.

In the case of the configuration as shown in FIG. 9 for example, it will take a time of W cycles until reading-out onto all of W×H pixel holding memory elements 301 is completed, if one pixel for each line is read out from the delay line memory. During this processing, no comparison between the A-image and B-image is executed, leading to a delay in processing time.

SUMMARY OF THE INVENTION

The present invention was made in view of the above-described problem, and improves, in an apparatus for generating a range image based on parallax images, the processing speed of processing for generating the range image.

According to a first aspect of the present invention, there is provided an image generation apparatus that generates a range image indicating a subject distance by comparing a first image with a second image, the first and second images having a parallax, the image generation apparatus comprising: a holding unit configured to acquire and hold pixel values of pixel groups that serve as targets for comparison from the respective first and second images; a reading unit configured to sequentially read out, from the pixel values of the respective pixel groups that are held in the holding unit, pixel values in one direction for each area that is set depending on a pixel position of the range image; a calculation unit configured to calculate an evaluation value based on the pixel values read out by the reading unit; an estimation unit configured to estimate the subject distance based on the evaluation value; and a generation unit configured to generate a range image based on the subject distance estimated by the estimation unit, wherein the reading unit reuses, by alternately changing a direction in which pixel values are read out, a read-out result that is obtained immediately before the direction in which pixel values are read out is inverted.

According to a second aspect of the present invention, there is provided a method for controlling an image generation apparatus that generates a range image indicating a subject distance by comparing a first image with a second image, the first and second images having a parallax, the method comprising: a holding step of acquiring and holding pixel values of pixel groups that serve as targets for comparison from the respective first and second images; a reading step of sequentially reading out, from the pixel values of the respective pixel groups that are held in the holding step, pixel values in one direction for each area that is set depending on a pixel position of the range image; a calculating step of calculating an evaluation value based on the pixel values read out in the reading step; an estimation step of estimating the subject distance based on the evaluation value; and a generation step of generating a range image based on the subject distance estimated in the estimation step, wherein in the reading step, by alternately changing a direction in which pixel values are read out, a read-out result that is obtained immediately before the direction in which pixel values are read out is inverted is reused.

According to a third aspect of the present invention, there is provided an image generation apparatus that generates a range image indicating a subject distance by comparing a first image with a second image, the first and second images having a parallax, the image generation apparatus comprising: a reading unit configured to sequentially read out, from pixel values of pixel groups that serve as targets for comparison of the respective first and second images, pixel values in one direction for each area that is set depending on a pixel position of the range image; a calculation unit configured to calculate an evaluation value based on the pixel values read out by the reading unit; an estimation unit configured to estimate the subject distance based on the evaluation value; and a generation unit configured to generate a range image based on the subject distance estimated by the estimation unit, wherein the reading unit reuses, by alternately changing a direction in which pixel values are read out, a read-out result that is obtained immediately before the direction in which pixel values are read out is inverted.

Further features of the present invention will become apparent from the following description of exemplary embodiments with reference to the attached drawings.

DESCRIPTION OF THE EMBODIMENTS

Hereinafter, an embodiment of the present invention will be described in detail with reference to the accompanying drawings.

Figure 1:
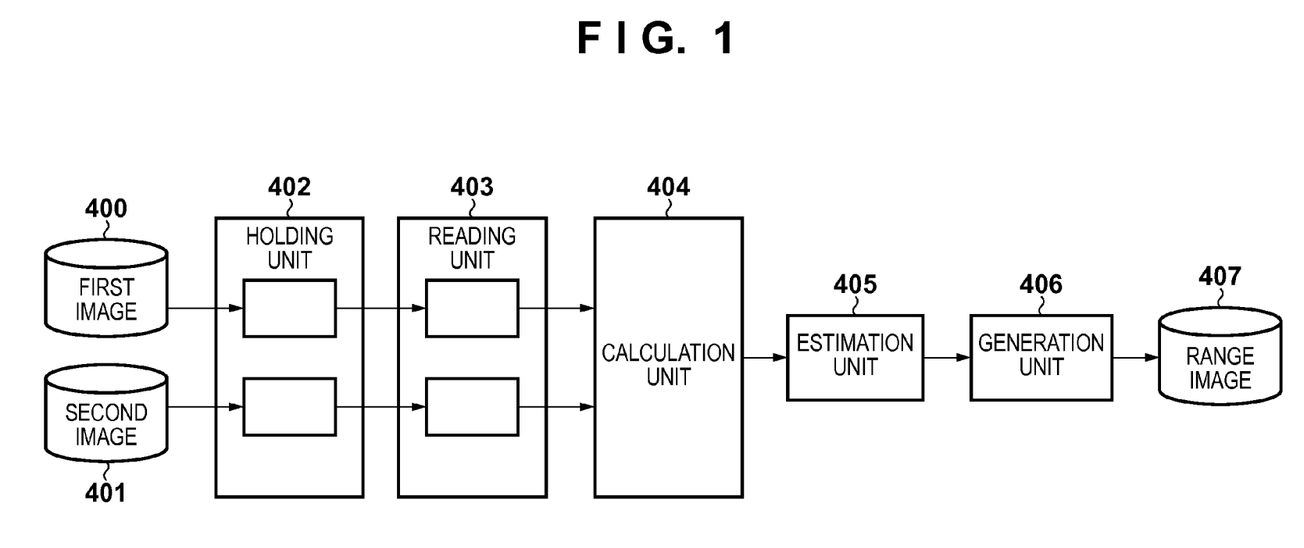
FIG. 1 is a diagram showing a configuration of a range image generation apparatus according to an embodiment of the present invention.

FIG. 1 is a diagram showing a configuration of a range image generation apparatus according to the embodiment of the present invention. The range image generation apparatus shown in FIG. 1 is an image generation apparatus for generating a range image that indicates a subject distance of a shot image by comparing a first image 400 and a second image 401, which are acquired with respect to the shot image and serve as a pair of parallax images that have a parallax.

In FIG. 1, the range image generation apparatus includes a holding unit 402, which holds pixel values of pixel groups that serve as targets for comparison from the respective first and second images 400 and 401 with respect to each pixel of a shot image, and a reading unit 403, which reads out the pixel values of the respective pixel groups for each area in order. The range image generation apparatus further includes a calculation unit 404 that calculates an evaluation value based on the pixel values read out by the reading unit 403, an estimation unit 405 that estimates a subject distance based on this evaluation value, and a generation unit 406 that generates a range image using the subject distance estimated by the estimation unit 405. Note that the units constituting the range image generation apparatus are controlled by a controller (not shown).

The holding unit 402 may be storage means that is ordinarily referred to, for example, as a delay line memory, and holds a part or all of an input image. The number of lines that are held as delay lines is equal to or more than the number of the lines that are read out by the reading unit 403.

Figure 2:
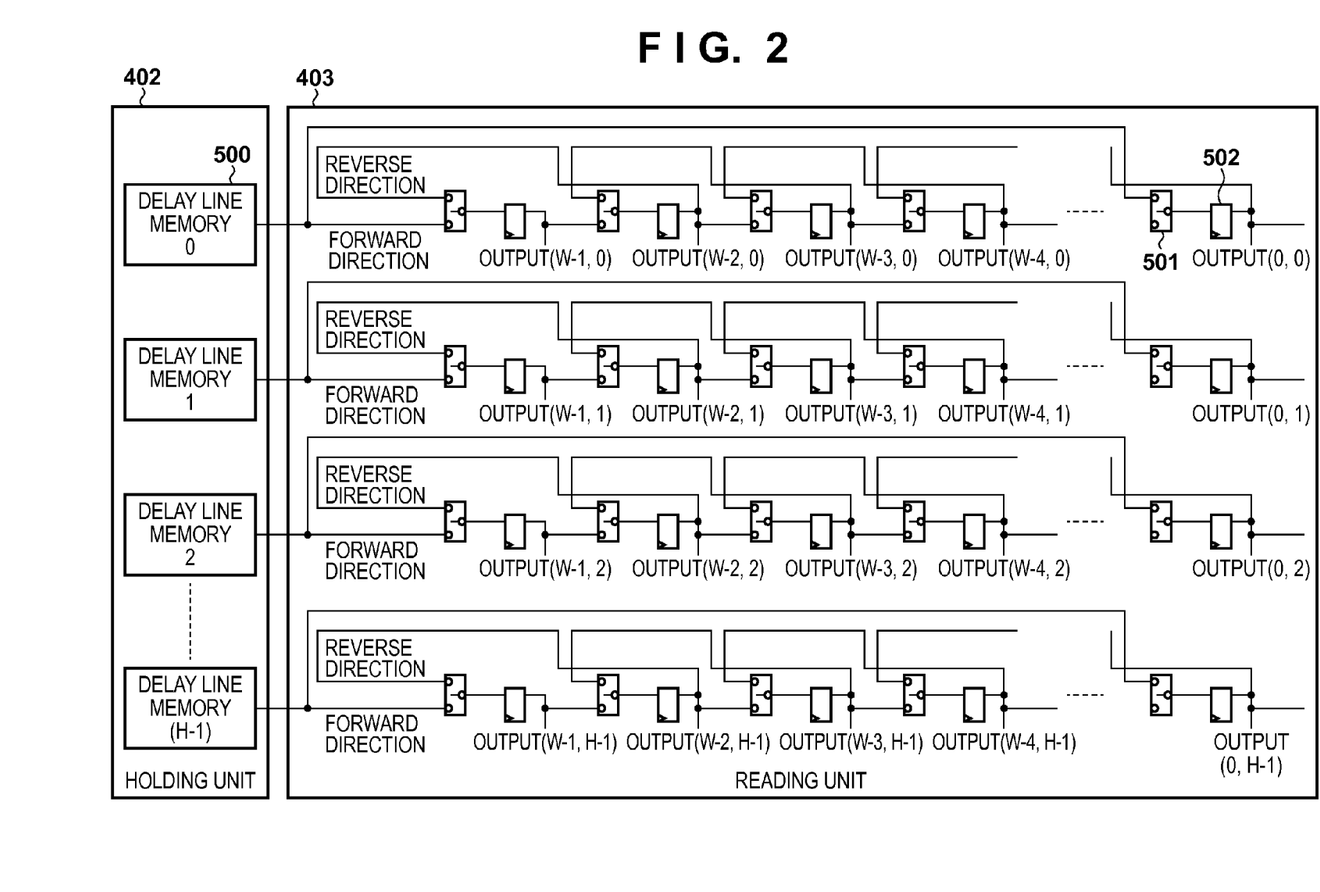
FIG. 2 is a diagram showing an internal configuration of a reading unit.

The reading unit 403 is means for sequentially reading out the pixel values from the holding unit 402, and holding the read pixel values in a memory element such as a flip-flop (hereinafter, referred to as "FF"). FIG. 2 shows the internal configuration of the reading unit 403 in the case of horizontal W pixels×vertical H pixels. This reading unit 403 shown in FIG. 2 is provided for each input image, and thus the range image generation apparatus includes two circuits of the reading unit 403, namely one for the first image 400 and one for the second image 401.

The delay line memories 500 include a plurality of line memories (a delay line memory 0 to a delay line memory (H−1)), each line memory holding pixel values for one line of an input image (the first image 400 or the second image 401). Therefore, the delay line memories 500 can hold pixel values for H lines of the input image. (W×H) pairs of a forward and reverse shift direction selector 501 and a pixel value holding FF (flip-flop) 502 are mounted.

Figure 3:
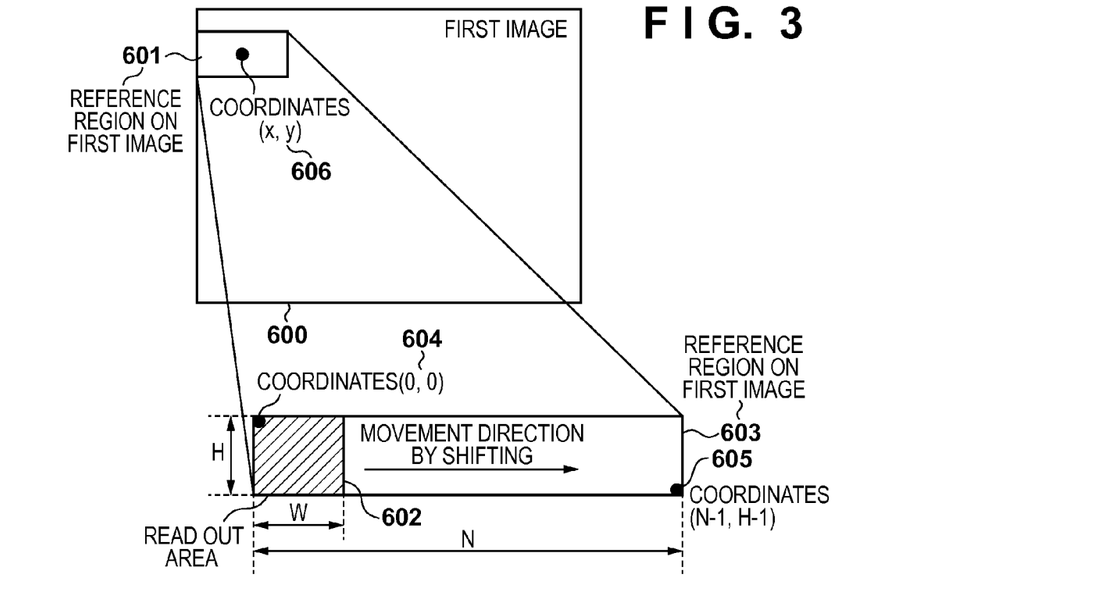
FIG. 3 is a diagram showing a region of a first image that is to be read into a reading unit with respect to coordinates (x, y).

First, an operation of the reading unit for the first image will be described. FIG. 3 shows the relationship between the first image, which is an input image, and its reference region. In order to obtain the pixel value (distance pixel value) that indicates the subject distance at coordinates (x, y) 606 of a range image, N×H pixels in the vicinity of the coordinates are assumed to belong to a reference region 601 on the first image. A reference region 603 on the first image of FIG. 3 is obtained by enlarging the reference region 601.

Pixels (H pixels) for one column including coordinates (0, 0) 604 are read from the holding unit 402 (delay line memories 500), and are stored in the pixel value holding FFs 502. The data stored in the pixel value holding FFs 502 are shifted in the forward direction. That is, pixels (H pixels) for one column including the coordinates (1, 0) are then read and stored in the pixel value holding FFs 502. By repeating this processing W times, the pixel values of W pixels×H pixels from the coordinates (0, 0) to the coordinates (W−1, H−1) are stored in the pixel value holding FFs 502, and the area corresponds to a read out area 602 in FIG. 3. A stand-by time until this state in which comparison is possible is here referred to as a storing time. When this state is realized, the calculation unit 404 provided downstream performs comparison to obtain a first comparison result. Note that a second image that serves as a target for comparison will be described later.

Then, pixels (H pixels) for one column including the coordinates (W, 0) are read from the holding unit 402 (delay line memories 500) and stored in the pixel value holding FFs 502 while the data stored in the pixel value holding FFs 502 is shifted in the forward direction. That is, by reading the pixels (H pixels) for one column including the coordinates (W, 0), pixel values of W pixels×H pixels from the coordinates (1, 0) to the coordinates (W, H−1) are held in the pixel value holding FFs 502. Here, the calculation unit 404 provided downstream performs comparison to obtain a second comparison result. By repeating this procedure (N−W) times, (N−W) comparison results are obtained. At this time point, all information needed for calculating the distance pixel of the coordinates (x, y) 606 has been obtained, and the distance pixel value of the coordinates (x, y) 606 is obtained by the downstream calculation unit 404, estimation unit 405, and generation unit 406. Furthermore, for the next preparation, pixels (H pixels) for one column including the coordinates (N, 0) are read from the holding unit 402 (delay line memories 500) and stored in the pixel value holding FFs 502 while the data stored in the pixel value holding FFs 502 is shifted in the forward direction.

Figure 4:
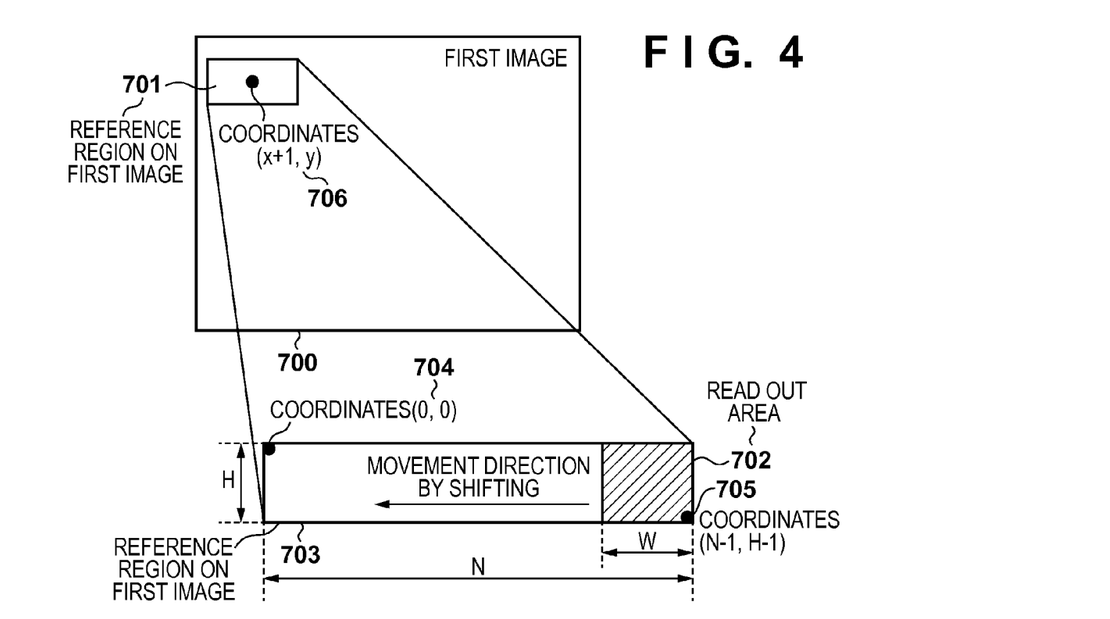
FIG. 4 is a diagram showing a region of the first image that is to be read into the reading unit with respect to coordinates (x+1, y).

FIG. 4 shows the relationship of the reference position when the next distance pixel is calculated. In order to obtain the distance pixel value of coordinates (x+1, y) 706, N×H pixels in the vicinity of the coordinates are assumed to belong a reference region 701 on the first image. A reference region 703 on the first image shown in FIG. 4 is obtained by enlarging the reference region 701.

As a result of the above-described preparation, the pixel values of a read out area 702 of FIG. 4 are held in the reading unit 403 (pixel value holding FFs 502). Then, by directly using the stored pixel values (reusing the result that was obtained immediately before) and inverting the shift direction into the reverse direction using the forward and reverse shift direction selector 501, shifting the pixel values of W pixels×H pixels held into the pixel value holding FFs 502 is performed repeatedly (N−W) times so as to obtain (N−W) comparison results. That is, the shift direction is inverted alternately each time the coordinates (x, y) of the range image at which the pixel value is to be obtained are shifted by one pixel. In other words, the reading unit 403 is configured as an assembly of shift resistors for both the forward and reverse directions of parallax.

Furthermore, for the next preparation, pixels (H pixels) for one column including the coordinates (1, 0) are read from the holding unit 402 (delay line memories 500) and stored in the pixel value holding FFs 502 while the data stored in the pixel value holding FFs 502 is shifted in the forward direction. With this preparation, the state shown in FIG. 5 is realized.

Figure 5:
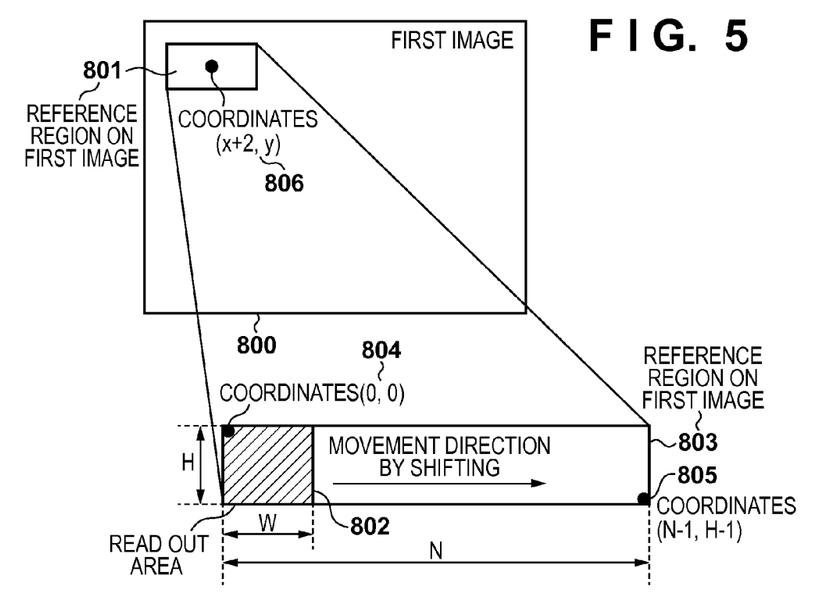
FIG. 5 is a diagram showing a region of the first image that is to be read into the reading unit with respect to coordinates (x+2, y).

For the calculation of the distance pixel value of coordinates (x+2, y) 806, the same processing as that for calculating the distance pixel value of the coordinates (x, y) 606 may be performed starting from the state shown in FIG. 5. Thereafter, the shift direction is inverted between the forward and reverse directions when the x coordinate is an even/odd number, and processing is performed repeatedly while the calculation order is inverted.

Figure 6:
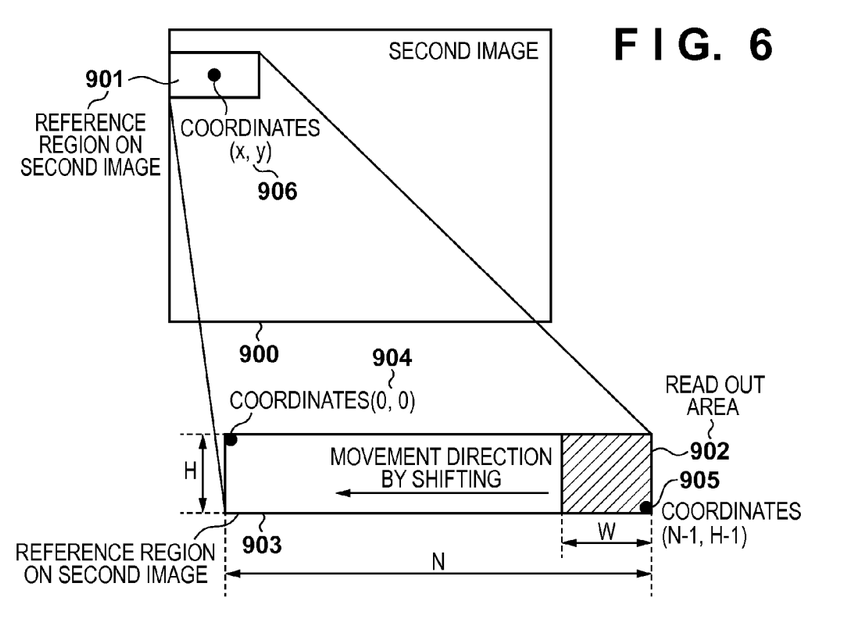
FIG. 6 is a diagram showing a region of a second image that is to be read into a reading unit with respect to coordinates (x, y).

Hereinafter, an operation of the reading unit for the second image will be described. Basically, the same processing as that of the reading unit for the first image is performed for the second image, but the shift direction with respect to the x coordinate is opposite to the direction in the case of the first image. When the first image is in the state of FIG. 3, the second image is in the state of FIG. 6. By performing the processing in the above-described manner, the storing time period is only necessary when one column of the range image at the left end is generated.

The calculation unit 404 compares a part of the first image read out to the reading unit 403 with a part of the second image read out to the reading unit 403 to obtain the degree of similarity. For example, when the reading unit 403 (pixel value holding FFs 502) is constituted by W pixels×H pixels, the degree of similarity is the sum of absolute difference (SAD) value that is obtained by the following formula:

$$\sum_{y=0}^{H-1} \sum_{x=0}^{W-1} |P(x, y) - Q(x, y)|$$

where P (x, y) is a read out area of the first image and Q (x, y) is a read out area of the second image. The degree of similarity is defined as an evaluation value.

The estimation unit 405 estimates a parallax based on (N−W) evaluation values that are obtained for one distance pixel. For example, a parallax estimation value may be the value that is obtained by multiplying the shift amount at the shift position that is determined as having the most similarity by a predetermined coefficient.

The generation unit 406 converts the parallax estimation value obtained by the estimation unit 405 into a distance pixel value in the range needed as a range image. For example, the value that is obtained by multiplying the parallax estimation value by a predetermined coefficient may also be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-104516, filed May 20, 2014, which is hereby incorporated by reference herein in its entirety.

What is claimed is:

1. An image generation apparatus that generates a range image indicating a subject distance by comparing, a first image with a second image, the first and second images having a parallax, the image generation apparatus comprising:
   a holding unit configured to acquire and hold pixel values of pixel groups that serve as targets for comparison from the respective first and second images;
   a reading unit configured to sequentially read out, from the pixel values of the respective pixel groups that are held in the holding unit, pixel values while shifting a reading area in one direction;
   a calculation unit configured to calculate an evaluation value based on the pixel values read out by the reading unit;
   an estimation unit configured to estimate the subject distance based on the evaluation value; and
   a generation unit configured to generate a range image based on the subject distance estimated by the estimation unit,
   wherein the reading unit reuses, by alternately changing a direction in which pixel values are read out every time the pixel values of the pixel groups held in the holding unit are renewed, a read-out result that is obtained immediately before the direction in which pixel values are read out is inverted.

2. The image generation apparatus according to claim 1, wherein the reading unit is configured as an assembly of shift registers with respect to both a forward direction and a reverse direction of the parallax.

3. The image generation apparatus according to claim 1, wherein the reading unit alternately changes the direction in which pixel values are read out and the calculation unit inverts an order of calculation of the evaluation value, and when an evaluation value of different coordinates of the range image is calculated, the reading unit reuses a read-out result that is obtained immediately before the direction in which pixel values are read out is inverted.

4. The image generation apparatus according to claim 1, wherein the reading unit includes a first reading sub-unit configured to read out the first image and a second reading sub-unit configured to read out the second image, and
the evaluation value is calculated with each of the first and second sub-reading units reusing the read-out result that is obtained immediately before the direction in which pixel values are read out is inverted.

5. A method for controlling an image generation apparatus that generates a range image indicating a subject distance by comparing a first image with a second image, the first and second images having a parallax, the method comprising:
   a holding step of acquiring and holding pixel values of pixel groups that serve as targets for comparison from the respective first and second images:
   a reading step of sequentially reading out, from the pixel values of the respective pixel groups that are held in the holding step, pixel values while shifting a reading area in one direction;
   a calculating step of calculating an evaluation value based on the pixel values read out in the reading step;
   an estimation step of estimating the subject distance based on the evaluation value; and
   a generation step of generating a range image based on the subject distance estimated in the estimation step,
   wherein in the reading step, by alternately changing a direction in which pixel values are read out every time the pixel values of the pixel groups held in the holding unit are renewed, a read-out result that is obtained immediately before the direction in which pixel values are read out is inverted is reused.

6. The method for controlling an image generation apparatus according to claim 5,
wherein the reading step is performed by shift registers with respect to both a forward direction and a reverse direction of the parallax.

7. The method for controlling an image generation apparatus according to claim 5,
wherein the direction in which pixel values are read out is changed alternately in the reading step and an order of calculation of the valuation value is inverted in the calculating step, and when an evaluation value of different coordinates of the range image is calculated, a read-out result that is obtained immediately before the direction in which pixel values are read out is inverted is reused in the reading step.

8. The method for controlling an image generation apparatus according to claim 5,
wherein the reading step includes a first reading sub-step of reading out the first image, and a second reading sub-step of reading out the second image, and
in the first and second reading sub-steps, the evaluation value is calculated reusing the read-out result that is obtained immediately before the direction in which pixel values are read out is inverted.

9. An image generation apparatus that generates a range image indicating a subject distance by comparing a first image with a second image, the first and second images having a parallax, the image generation apparatus comprising:
   a reading unit configured to sequentially read out, from pixel values of pixel groups that serve as targets for comparison of the respective first and second images, pixel values while shifting a reading area in one direction;
   a calculation unit configured to calculate an evaluation value based on the pixel values read out by the reading unit;
   an estimation unit configured to estimate the subject distance based on the evaluation value; and
   a generation unit configured to generate a range image based on the subject distance estimated by the estimation unit,
   wherein the reading unit reuses, by alternately changing a direction in which pixel values are read out, a read-out result that is obtained immediately before the direction in which pixel values are read out is inverted.

* * * * *